United States Patent [19]
Tanaka et al.

[11] Patent Number: 5,993,229
[45] Date of Patent: Nov. 30, 1999

[54] RELAYING APPARATUS BETWEEN RELATIVE ROTARY MEMBERS

[75] Inventors: Hiraku Tanaka; Satoshi Ishikawa, both of Shizuoka-ken, Japan

[73] Assignee: Yazaki Corporation, Tokyo, Japan

[21] Appl. No.: 08/925,177

[22] Filed: Sep. 9, 1997

[30] Foreign Application Priority Data

Sep. 13, 1996 [JP] Japan .................................. 8-243591

[51] Int. Cl.⁶ .................................................. H01R 35/04
[52] U.S. Cl. .............................................. 439/164; 439/15
[58] Field of Search ....................................... 439/164, 15

[56] References Cited

U.S. PATENT DOCUMENTS 5,813,875   9/1998   Ishikawa et al. ..................... 439/164

FOREIGN PATENT DOCUMENTS 8-222340   8/1996   Japan .

*Primary Examiner*—Gary F. Paumen
*Attorney, Agent, or Firm*—Finnegan, Henderson, Farabow, Garrett & Dunner, L.L.P.

[57] ABSTRACT

A relaying apparatus between relative rotary members includes a rotary body 11, a fixed body 12 for surrounding the rotary body 11 with a predetermined distance and for rotating relative to the rotary body and a flexible flat cable 13 linked to the rotary body 11 and the fixed body 12 for electrically relaying between the rotary body 11 and the fixed body 12. The rotary body 11 and the fixed body 12 have a sliding surface A and a sliding surface B respectively for controlling a move in an axial direction by mutual sliding, and at least one of the sliding surface A and the sliding surface B has a lubricant storing portion 12d having a groove formed for storing lubricant grease G therein.

5 Claims, 5 Drawing Sheets

RELAYING APPARATUS BETWEEN RELATIVE ROTARY MEMBERS

BACKGROUND OF THE INVENTION

1. Field of the Invention

The present invention relates to a relaying apparatus between relative rotary members for carrying out an electrical connection between rotary members which rotate relatively through a cable.

2. Description of the Related Art

A relaying apparatus between relative rotary members according to a related art includes a rotary body having an internal cylindrical portion, a fixed body having an external cylindrical portion for surrounding the internal cylindrical portion with a predetermined distance and a C-shaped moving body provided within a space between the rotary body and the fixed body. A flexible flat cable is disposed in a space between the rotary body and the inner peripheral surface of the C-shaped moving body and is also disposed in a space between the inner peripheral surface of the fixed body and the outer peripheral surface of the C-shaped moving body, through a gap portion of the C-shaped moving body. A cover member is fitted to the fixed body in order to prevent the C-shaped moving body and the flexible flat cable from escaping from the fixed body.

Accordingly, when the rotary body is rotated relative to the fixed body, a sliding surface of the rotary body rotates by sliding on a sliding surface of the fixed body. In order to prevent a sliding noise and abrasion, lubricant which is a lubricating material is coated at a plurality of points on these sliding surfaces. In this case, it is necessary that the lubricant is adhered to as many points as possible by a small quantity at each point so that the lubricant is uniformly distributed to the sliding surfaces.

However, in order to adhere the lubricant by a small quantity to each point, an apparatus for supplying the lubricant must be the one having a high precision of quantity measuring. Further, it is necessary to adhere the lubricant to many points. Accordingly, there has been a problem that a high cost is required for coating the lubricant to meet the above requirements.

SUMMARY OF THE INVENTION

With a view to eliminating the above-described problems, it is an object of the present invention to provide a relaying apparatus between relative rotary members which can reduce the cost of coating a lubricant to a sliding portion between the rotary body and the fixed body.

In order to achieve the above object, according to a first aspect of the present invention, there is provided a relaying apparatus between relative rotary members, comprising: a first rotary body having a first sliding surface; a second rotary body for surrounding the first rotary body with a predetermined distance and for rotating relative to the first rotary body, the second rotary body having a second sliding surface sliding with the first sliding surface for controlling a relative motion between the first and the second rotary bodies in an axial direction of the rotation of the first and the second rotary bodies by mutually sliding; and a flexible flat cable linked to the first rotary body and the second rotary body, for electrically relaying between the first and second rotary bodies, wherein at least one side of the first sliding surface and the second sliding surfaces has a lubricant storing portion having a groove formed for storing lubricant therein.

In the above construction, when the first sliding surface and the second sliding surface are rotated relative to each other by keeping a close contact with each other after the lubricant has been adhered to a plurality of points on the second sliding surface, for example, the lubricant is distributed to the space between the first sliding surface and the second sliding surface and at the same time, the lubricant enters the lubricant storing portion and is stored in it. In this case, the quantity of the lubricant to be adhered to each point on the second sliding surface is set at a quantity which is determined by taking the quantity of the lubricant stored in the lubricant storing portion into consideration. In other words, the quantity of the lubricant to be supplied to each point on the second sliding surface becomes larger than the quantity of the lubricant according to the conventional case which has no lubricant storing portion.

Accordingly, an apparatus for supplying the lubricant may be the one of a relatively low precision of measuring quantity of the lubricant. Further, since the lubricant stored in the lubricant storing portion works as if this lubricant has been adhered in advance to the position of the lubricant storing portion, it becomes possible to reduce the number of points to which the lubricant is adhered. As a result, it becomes possible to reduce the cost of coating the lubricant to the sliding portions of the rotary body and the fixed body respectively.

Further, since the lubricant stored in the lubricant storing portion is gradually supplied to between the first sliding surface and the second sliding surface, it becomes possible to improve the lubricating performance.

According to a second aspect of the present invention, as it depend from the first aspect, the lubricant storing portion is formed by a plurality of number to extend in a radial direction of the rotation of the first and the second rotary bodies.

In the construction above, since the lubricant storing portion is formed by a plurality of number to extend in a radial direction, it becomes possible to enter the lubricant instantly in each lubricant storing portion by a relative rotation of the first surface and the second sliding surface by keeping a close contact with each other after the lubricant has been adhered to a plurality of points on the second sliding surface, for example. Accordingly, it becomes possible to uniformly distribute the lubricant to the first sliding surface and the second sliding surface without an overflow of the lubricant from between the first sliding surface and the second sliding surface.

According to a third aspect of the present invention, as it depend from the second aspect, the first sliding surface is formed to extend to the outside in the radial direction from a cylindrical outer wall surface of the first rotary body, and the second sliding surface is formed to extend to the outside in the radial direction from a cylindrical inner wall surface of the second rotary body which is engaged with the cylindrical outer wall surface, and the lubricant storing portions are formed to extend to the outside in a radial direction from the cylindrical inner wall surface.

In the construction above, when the first sliding surface and the second sliding surface are relatively rotated by keeping a close contact with each other after the lubricant has been adhered to a plurality of points on the second sliding surface, for example, the lubricant enters immediately in the lubricant storing portions. Then, the lubricant which entered the lubricant storing portions reach the cylindrical outer wall surface of the first rotary body or a cylindrical inner wall surface of the second rotary body through the lubricant storing portions. In other words, it becomes possible to supply the lubricant adhered to the first sliding surface or the second sliding surface to between the cylindrical outer wall surface and the cylindrical inner wall surface. Accordingly, it becomes not necessary to adhere the lubricant to the cylindrical outer wall surface, for example, for lubricating the cylindrical outer wall surface and the cylindrical inner wall surface, so that the number of points to which the lubricant is adhered can be reduced. As a result, it becomes possible to reduce the cost required for coating the lubricant to between the rotary body and the fixed body.

According to a fourth aspect of the present invention, as it depend from the third aspect, a wall surface of the lubricant storing portion at the opposite side of the cylindrical inner wall surface is slanted in a direction to be closer to the cylindrical inner wall surface at a deeper side.

In the construction above, lubricant entered the lubricant storing portions from the second sliding surface is pushed out to the inside in the radial direction by the wall surface formed in the slanted direction. In other words, the lubricant is pushed out to the cylindrical inner wall surface side via the wall surface.

Therefore, it becomes possible to improve the lubricating performance between the cylindrical inner wall surface of the second rotary body and the cylindrical outer wall surface of the first rotary body.

According to a fifth aspect of the present invention, as it depend from the first aspect, the relaying apparatus between relative rotary members further comprises a cover member for engaging with the second rotary body, the cover member having a fourth sliding surface sliding with a third sliding surface of the first rotary body, wherein at least one side of the third and the fourth sliding surfaces has a lubricant storing portion having a groove formed for storing lubricant therein.

In the construction above, the lubricant entered into a second lubricant storing portion formed the one side of the third and the fourth sliding surfaces is supplied to between the third sliding surface and the fourth sliding surface, so that the third sliding surfaces and the fourth sliding surface are lubricated.

Therefore, the lubricating effect obtained by and similar to that the first sliding surface and the second sliding surface are lubricated can be obtained at the portions where the fourth sliding surface of the cover member slides with the third sliding surface of the first rotary body and at the portions where the cover member and the first rotary body slide with each other. Accordingly, it becomes possible to improve the lubricating performance between the third sliding surface of the first rotary body and the fourth sliding surface of the cover member.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
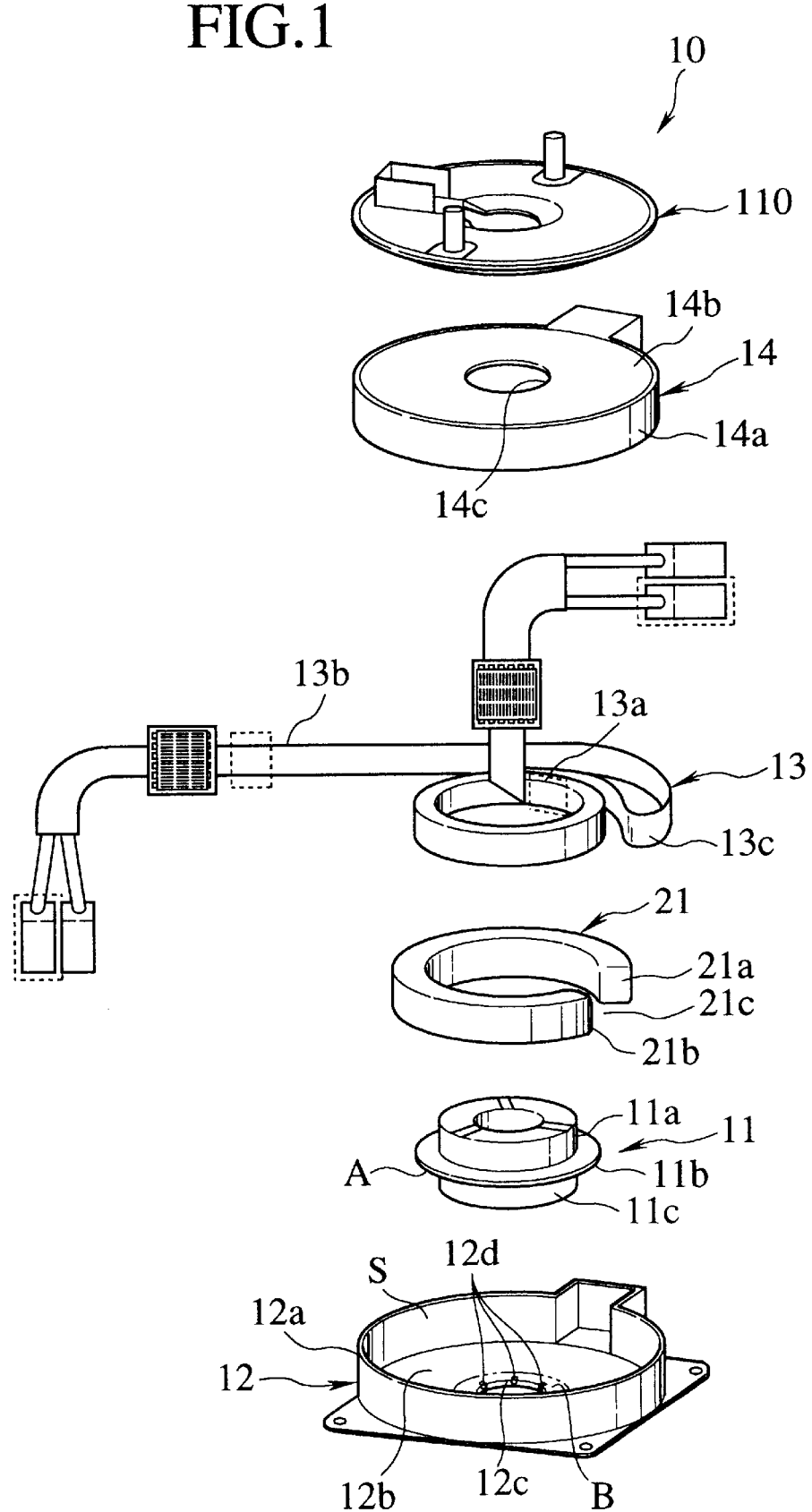
FIG. 1 is an exploded perspective view of the relaying apparatus between relative rotary members according to a first embodiment of the present invention.

There will be detailed below the preferred embodiments of the present invention with reference to the accompanying drawings. Like members are designated by like reference characters.

Referring now to FIG. 1, a relaying apparatus between relative rotary members according to a first embodiment of the present invention will be described generally. The relaying apparatus between relative rotary members 10 of the present invention includes a rotary body 11 as a first rotary body having an inside cylindrical portion 11a, a fixed body 12 as a second rotary body having an outside cylindrical portion 12a for surrounding the inside cylindrical portion 11a with a predetermined distance, a cable 13 as a flexible flat cable accommodated within a ring-shaped space S between the inside cylindrical portion 11a and the outside cylindrical portion 12a along the space S, with its inner peripheral end portion 13a being held by the inside cylindrical portion 11a and its outer peripheral end portion 13b being held by the outside cylindrical portion 12a, and a C-shaped moving body 21 movably provided along the space S and for inverting the cable 13 at an opening portion 21c at an inverting portion 13c.

The rotary body 11 is provided with a flange 11b for being slidably mounted on a lower cover 12b to be described later.

The moving body 21 is arranged to be movable along a peripheral direction of the space S while inverting the cable 13 through one opening end 21a or other opening end 21b of the opening portion 21c.

The fixed body 12 has the lower cover 12b formed integrally with the outside cylindrical portion 12a, for covering the lower side of the space S. The lower cover 12b is formed with a cylindrical inner wall surface 12c for being rotatably engaged with the cylindrical outer wall surface 11c which extends toward the downside from the flange 11b. In other words, a through-hole structured by the cylindrical inner wall surface 12c is formed at the central portion of the lower cover 12b. The lower surface of the flange 11b becomes a sliding surface A as a first sliding surface and the upper surface of the lower cover 12b facing the sliding surface A becomes a sliding surface B as a second sliding surface.

Further, the fixed body 12 is provided with a cover member 14. The cover member 14 is integrally formed with a cylinder portion 14a for surrounding the periphery of the outside cylinder portion 12a and an upper cover 14b for covering the upper side of the space S, and is fixedly fitted to the fixed body 12.

On the upper side of the cover member 14, an outside guiding cover 110 for guiding the inner peripheral end portion 13a of the cable to the outside. The outside guiding cover 110 is linked with the rotary body and rotates together with the rotary body 11.

The rotary body 11 is linked to a steering wheel side of a steering wheel portion of an automobile, for example, and the fixed body 12 is fixed to a steering column side.

According to the relaying apparatus between relative rotary members 10 which is structured as described above, when the inside cylindrical portion 11a, for example, rotates in a counter-clockwise direction in FIG. 1, the cable 13 moves to be wound around the inside cylindrical portion 11a. Therefore, the cable 13 at the outside of the moving body 21 is inverted while keeping contact with the opening end 21a of the moving body 21 and enters the inside of the moving body 21 so as to be wound around the inside cylindrical portion 11a. In this case, the moving body 21 has its other opening end 21a pressed against the inverting portion 13c of the cable 13, so that the moving body 21 rotates in a counter-clockwise direction together with the inverting portion 13c.

Further, when the inside cylindrical portion 11a rotates in a clockwise direction with respect to the outside cylindrical portion 12a, the cable 13 which has been wound around the inside cylindrical portion 11a is rewound and moves to the circumference. Accordingly, the cable 13 which has been wound around the inside cylindrical portion 11a is inverted while keeping in contact with the other opening end 21b of the moving body 21, so that the cable 13 moves to a outside of the moving body 21, and further, is brought into close contact with the inner surface of the outside cylindrical portion 12a. In this case, the moving body 21 has its other opening end 21b pressed against the inverting portion 13c of the cable, so that the moving body 21 rotates in a clockwise direction together with the inverting portion 13c.

Then, the rotary body 11 rotates both in the clockwise direction and in the counter-clockwise direction with respect to the fixed body 12.

According to the above-described relaying apparatus between relative rotary members 10, since the sliding surface A and the sliding surface B and the cylindrical outside wall portion 11c and the cylindrical inside wall surface 12c slide with each other respectively by the relative rotation of the rotary body 11 and the fixed body 12, it is necessary to prevent sound and abrasion due to the sliding by coating lubricant to these sliding portions. For coating the lubricant, a lubricant G, for example grease, is adhered to a plurality of points on the cylindrical outside surface 11c and the sliding surface B. In this case, it is necessary that the lubricant G is adhered to as many points as possible by a small quantity at each point and that the lubricant is uniformly distributed to the sliding portions. Therefore, a structure which enables a reduction of the cost of coating the lubricant by a uniform distribution of the lubricant G to the sliding portions will be explained in detail with reference to FIGS. 2 to 4 hereinafter. In addition, a second embodiment, a third embodiment and a fourth embodiment of the present invention will be explained in detail with reference to FIG. 5, FIGS. 6 to 9 and FIGS. 10 to 11 respectively, hereinafter.

Figure 2:
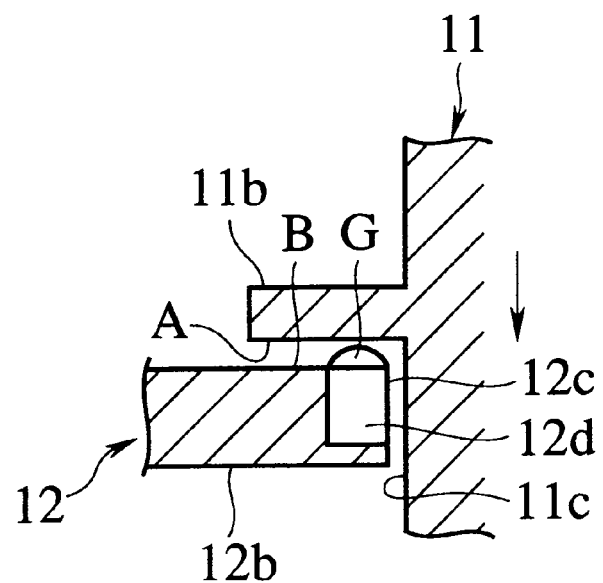
FIG. 2 is a cross-sectional view of a main portion of the relaying apparatus between relative rotary members according to the first embodiment of the present invention.
Figure 3:
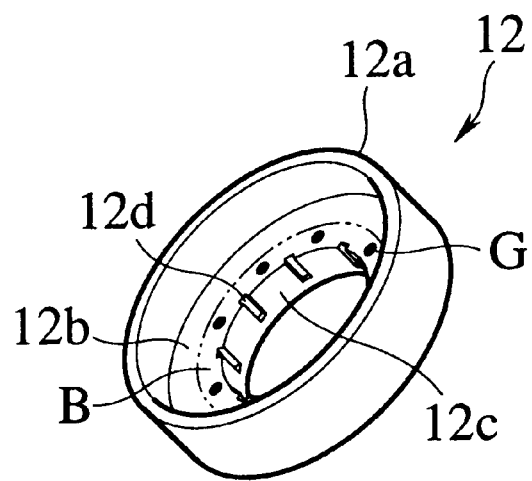
FIG. 3 is a perspective view for showing a fixed body in the relaying apparatus between relative rotary members according to the first embodiment of the present invention.
Figure 4:
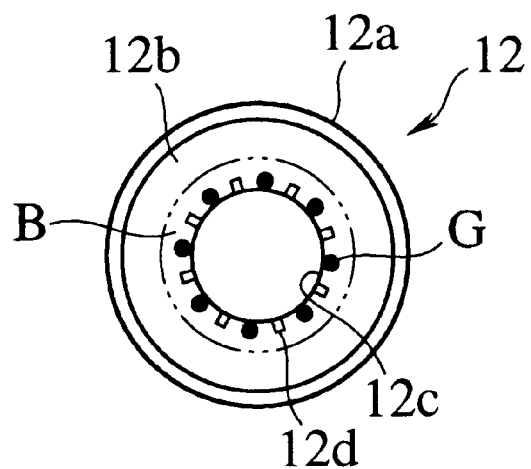
FIG. 4 is a top plan view for showing a fixed body in the relaying apparatus between relative rotary members according to the first embodiment of the present invention.

The main portions of the invention will be explained with reference to FIGS. 2 to 4 showing the main portions of the relaying apparatus between relative rotary members according to the first embodiment of the present invention. A lubricant storing portion 12d is formed on the sliding surface B of the fixed body 12 as a second rotary body.

In other words, the lubricant storing portion 12d for storing the lubricant G is formed on the sliding surface B. As shown in FIG. 2, the lubricant storing portion 12d is formed in a rectangular shape so as to have a constant depth from the sliding surface B and is formed to extend to the outside in a radial direction from the cylindrical inner wall surface 12c. Further, the lubricant storing portion 12d is formed by a plurality of number (eight according to the present embodiment) with equal distance around the cylindrical inner wall surface 12c, as shown in FIG. 3 and FIG. 4.

According to the relaying apparatus between relative rotary members 10 which is structured as described above, when the sliding surface A and the sliding surface B are moved relative to each other by keeping a close contact with each other after the lubricant G is adhered to between the lubricant storing portions 12d on the sliding surface B, the lubricant G is distributed to between the sliding surface A and the sliding surface B and is also stored in each lubricant storing portion 12d. In this case, the quantity of the lubricant G to be adhered to each point on the sliding surface B is set at a quantity which is determined by taking the quantity stored in the lubricant storing portions 12d into account. Namely, the quantity of the lubricant G to be supplied to each point on the sliding surface B becomes larger than the quantity in the prior-art case which does not have lubricant storing portions 12d. Accordingly, it becomes possible to use even an apparatus of which quantity measuring precision is relatively low, for supplying the lubricant G. Further, since the lubricant G being stored in the lubricant storing portions 12d works as if the lubricant G has been adhered in advance to the positions of the lubricant storing portions 12d, the number of points for adhering the lubricant G can be reduced accordingly.

Further, the lubricant G which entered the lubricant storing portions 12d reaches the cylindrical inner wall surface 12c through the lubricant storing portions 12d. In other words, the lubricant G which has been adhered in advance to the sliding surface B can also be supplied to between the cylindrical outer wall surface 11c and the cylindrical inner wall surface 12c. Accordingly, it is not necessary to adhere the lubricant G to the cylindrical outer wall surface 11c or the cylindrical inner wall surface 12c for the purpose of lubricating the cylindrical outer wall surface 11c and the cylindrical inner wall surface 12c.

Accordingly, it is possible to reduce the cost of coating the lubricant G to the sliding portions of the rotary body 11 and the fixed body 12.

Further, since the lubricant G which has been stored in the lubricant storing portions 12d is gradually supplied to between the sliding surface A and the sliding surface B and to between the cylindrical outer wall surface 11c and the cylindrical inner wall surface 12c, it becomes possible to improve the lubricating performance.

Further, since the lubricant storing portion 12d is formed by a plurality of number so as to extend in a radial direction, the lubricant G can be entered instantly into each lubricant storing portion 12d by the relative rotation of the sliding surface A and the sliding surface B by keeping a close contact with each other. Accordingly, the lubricant G can be uniformly distributed to between the sliding surface A and the sliding surface B without an overflow of the lubricant G from between the sliding surface A and the sliding surface B.

Figure 5:
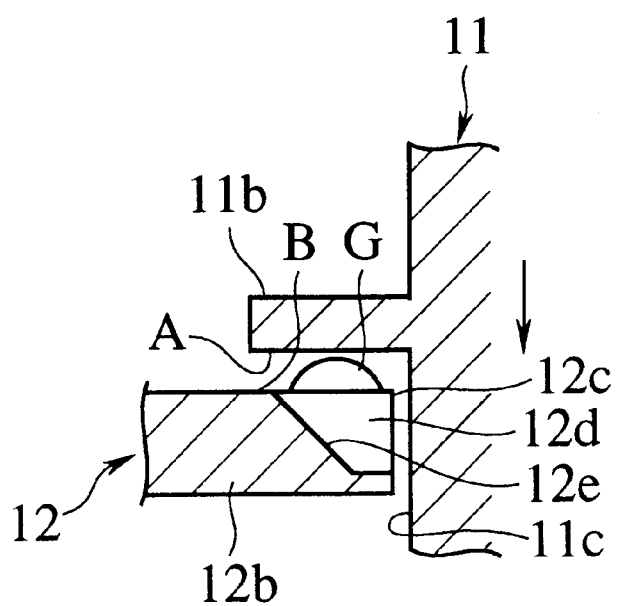
FIG. 5 is a cross-sectional view of a main portion of the relaying apparatus between relative rotary members according to a second embodiment of the present invention.
Figure 6:
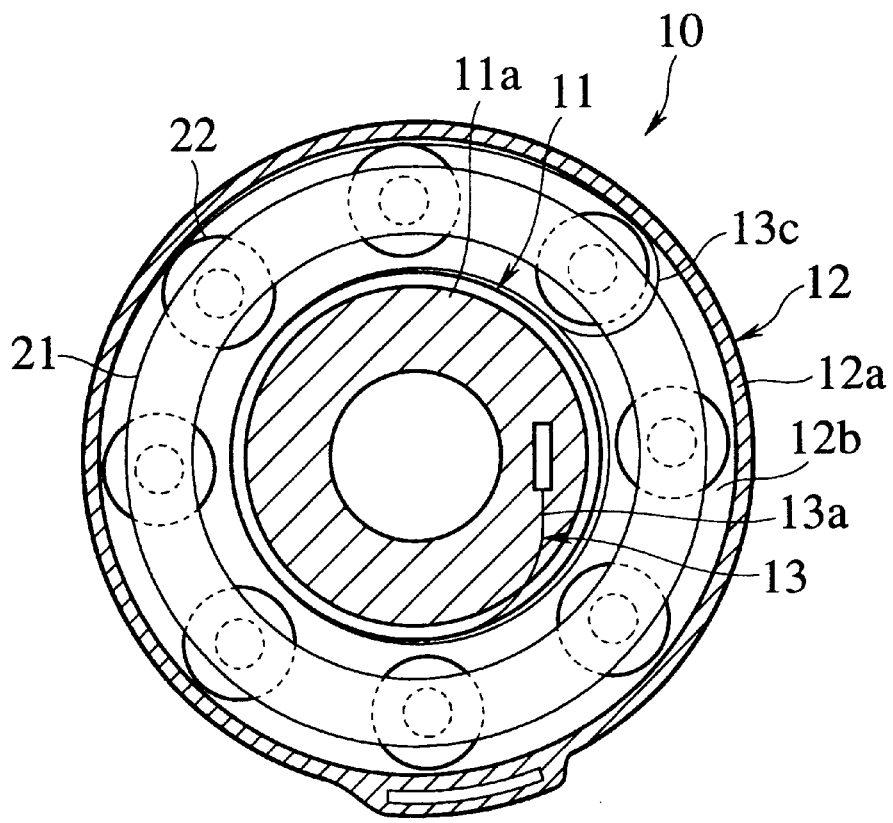
FIG. 6 is a top plan view of the relaying apparatus between relative rotary members according to a third embodiment of the present invention.

Next, a second embodiment of the present invention will be explained below with reference to FIG. 5. Portions which are common to those in the first embodiment will be attached with the same reference numbers and their explanation will be simplified. The second embodiment is different from the first embodiment in that a wall surface 12e which is opposite to the cylindrical inner wall surface 12c of the lubricant storing portion 12d is formed in a slanted shape with a slope.

In other words, the wall surface 12e is formed in a slope so that the deep slope portion is positioned at the cylindrical inner wall surface 12c side.

According to the relaying apparatus between relative rotary members 10 which is structured as described above, the lubricant G which entered the lubricant storing portions 12d from the sliding surface B is pushed out to the inside in a radial direction by the wall surface 12e formed in the slope. In other words, the lubricant G is pushed out to the cylindrical inner wall surface 12c side via the wall surface 12e. Accordingly, it becomes possible to improve the lubricating performance between the cylindrical inner wall surface 12c and the cylindrical outer wall surface 11c.

Next, a third embodiment of the present invention will be explained below with reference to FIGS. 6 to 9. Portions which are common to those in the first embodiment will be attached with the same reference numbers and their explanation will be simplified. The third embodiment of the present invention is different from the first embodiment in that a roller 22 is provided in the moving body 21 to smooth the move of the cable 13, that the lower cover 12b of the fixed body 12 and the upper cover 14b of the cover member 14 are slidable, and that the cable 13 is inverted in the inverting portion 13c by the roller 22 instead of the opening end 21a of the moving body 21.

Figure 7:
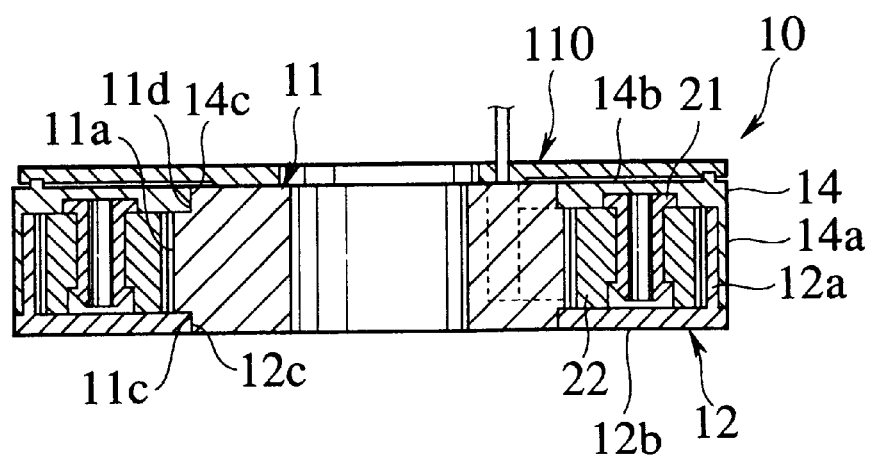
FIG. 7 is a cross-sectional view of the relaying apparatus between relative rotary members according to the third embodiment of the present invention.

In other words, as shown in FIG. 7, the rotary body 11 is provided with the first cylindrical outer wall surface 11c and a second cylindrical outer wall 11d at each end portion of the lower side and the upper side respectively. The first cylindrical outer wall surface 11c and the second cylindrical inner wall surface 11d are formed by one stage thinner than the outer peripheral surface of the inside cylindrical portion 11a. From the first cylindrical outer wall surface 11c, a first sliding surface A1 is formed to extend to the outside in a radial direction, as shown in FIG. 9. From the second cylindrical outer wall surface 11d, a third sliding surface A2 is formed to extend to the outside in a radial direction, as shown in FIG. 8.

On the other hand, as shown in FIG. 9, the lower cover 12b is formed with a first cylindrical inner wall 12c which is rotatably engaged with the first cylindrical outer wall surface 11c , and is also formed with a first sliding surface B1 which faces the first sliding surface A1. As shown in FIG. 8, the upper cover 14b is formed with a second cylindrical inner wall surface 14c which is rotatably engaged with the second cylindrical outer wall surface 11d and is formed with a fourth sliding surface B2 so as to face the third sliding surface A2.

Further, as shown in FIG. 9, a first lubricant storing portion 12d for storing the lubricant G is formed on the second sliding surface B1 of the lower cover 12b. The first lubricant storing portion 12d is formed in a rectangular shape to have a constant depth from the first sliding surface B1 and is also formed to extend to the outside in a radial direction from the first cylindrical inner wall surface 12c. Further, the first lubricant storing portion 12d is formed by a plurality of number (eight in the present embodiment) with an equal distance on the circumference of the first cylindrical inner wall surface 12c along this peripheral direction.

Figure 8:
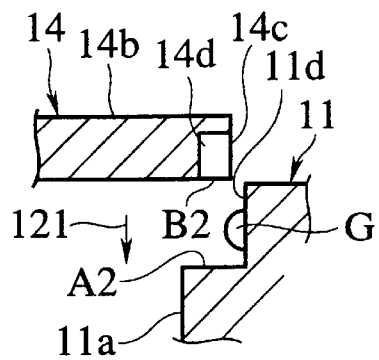
FIG. 8 is a cross-sectional view of a main portion of the relaying apparatus between relative rotary members according to the third embodiment of the present invention.
Figure 9:
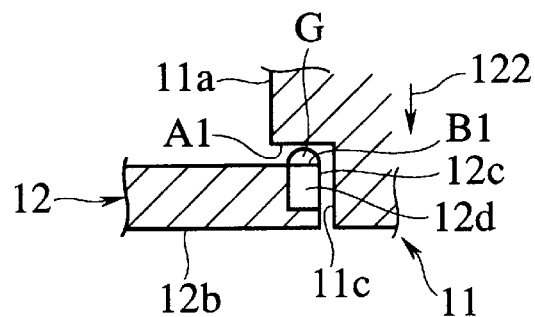
FIG. 9 is a cross-sectional view of a gist portion of the relaying apparatus between relative rotary members according to the third embodiment of the present invention.

Further, as shown in FIG. 8, a second lubricant storing portion 14d for storing the lubricant G is formed on the fourth sliding surface B2 of the upper cover 14b. The second lubricant storing portion 14d is formed in a rectangular shape to have a constant depth from the fourth sliding surface B2 and is also formed to extend to the outside in a radial direction from the second cylindrical inner wall surface 14c. Further, the second lubricant storing portion 14d is formed by a plurality of number (eight in the present embodiment) with an equal distance on the circumference of the second cylindrical inner wall surface 14c along this peripheral direction.

According to the relaying apparatus between relative rotary members 10 which is structured as described above, at first, the lubricant G is adhered to between the first lubricant storing portions 12d on the second sliding surface B1, and then the rotary body 11 is moved downward in a direction sown by an arrow 122 while rotating the rotary body 11 to the lower cover 12b. Then, the first sliding surface A1 is brought into close contact with the second sliding surface B1 while the first sliding surface A1 is rotating, so that the lubricant G is distributed to between the first sliding surface A1 and the second sliding surface B1 and stays in each of the first lubricant storing portions 12d.

On the other hand, after the lubricant G has been adhered to the second cylindrical outer wall surface 11d at a pitch corresponding to the pitch of each of the second lubricant storing portions 14d, the cover member 14 is moved downward in a direction as shown by an arrow 121 while being rotated relative to the rotary body 11. Then, the lubricant G is distributed to between the second cylindrical outer wall surface 11d and the second cylindrical inner wall surface 14c, and also enters each of the second lubricant storing portions 14d from the second cylindrical inner wall surface 14c. The lubricant G which entered each of the second lubricant storing portions 14d is supplied to between the third sliding surface A2 and the fourth sliding surface B2, so that the third sliding surfaces A2 and the fourth sliding surface B2 are lubricated.

Accordingly, the lubricating effect similar to that obtained by the first embodiment can be obtained at the portions where the lower cover 12b and the rotary body 11 are slid with each other and at the portions where the upper cover 14b and the rotary body 11 are slid with each other.

Figure 10:
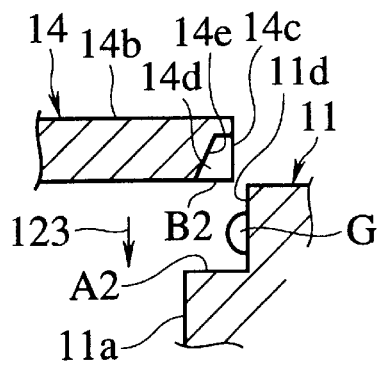
FIG. 10 is a cross-sectional view of a main portion of the relaying apparatus between relative rotary members according to a fourth embodiment of the present invention.
Figure 11:
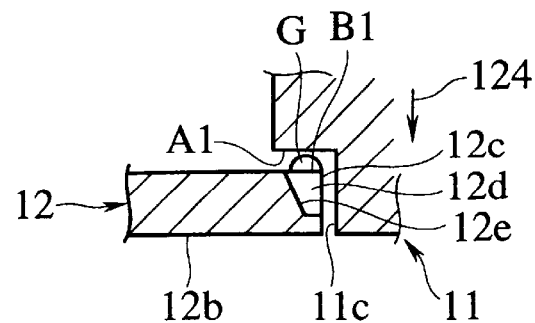
FIG. 11 is a cross-sectional view of a main portion of the relaying apparatus between relative rotary members according to the fourth embodiment of the present invention.

Next, a fourth embodiment of the present invention will be explained below with reference to FIGS. 10 and 11. Portions which are common to those in the third embodiment will be attached with the same reference numbers and their explanation will be simplified. The fourth embodiment of the present invention is different from the third embodiment in that the shape of the first lubricant storing portions 12d and the shape of the second lubricant storing portions 14d are different from those of the third embodiment.

Namely, the wall surface 12e of the first lubricant storing portions 12d is formed in the shape similar to the shape of the wall surface 12e shown in the second embodiment. Also, the wall surface 14e of the second lubricant storing portions 14d is formed in the shape similar to the shape of the wall surface 12e shown in the second embodiment.

Accordingly, in the relaying apparatus between relative rotary members 10 which is structured as described above, the lubricating effect similar to that obtained by the second embodiment can be obtained at the portions where the lower cover 12b and the rotary body 11 are slid with each other and at the portions where the upper cover 14b and the rotary body 11 are slid with each other.

Although it is so structured that the lubricant storing portions 12d and 14d are provided on the sliding surfaces B, B1 and B2 of the lower cover 12b or the upper cover 14b according to the above-described embodiments, it is also good to structure that the lubricant storing portions 12d and 14d are provided on the sliding surfaces A, A1 and A2 of the rotary body 11. However, as shown in each of the above-described embodiments, it is desirable that the lubricant storing portions are provided on the sliding surface at the member side where an angular portion formed by the sliding surface and the cylindrical wall surface is convex (at the side of the covers 12b and 14b in the above-described embodiments). When the above-described structure is provided, by a mere adhesion of the lubricant G to only the sliding surface, for example, it becomes possible to supply this lubricant to both positions of the sliding surface and the cylindrical wall surface.

While preferred embodiments of the present invention have been described using specific terms, such description is for illustrative purposes, and it is to be understood that changes and variations may be made without departing from the spirit or scope of the following claim.

What is claimed is:

1. A relaying apparatus between relative rotary members, comprising:

a first rotary body having a first sliding surface and an outer wall surface;

a second rotary body surrounding the first rotary body with a predetermined distance and being rotatable relative to the first rotary body, the second rotary body having a second sliding surface for sliding against the first sliding surface, the second rotary body having an inner wall surface facing the outer wall surface of the first rotary body, the first and second sliding surfaces being configured to control a relative motion between the first and the second rotary bodies in an axial direction of the rotation of the first and the second rotary bodies; and a flexible flat cable linking the first rotary body and the second rotary body, for electrically relaying between the first and second rotary bodies, wherein at least one of the first and second sliding surfaces has a lubricant storing portion having a groove formed for storing lubricant therein, the lubricant storing portion being configured to supply the lubricant between the outer wall surface of the first rotary body and the inner wall surface of the second rotary body.

2. The relating apparatus between relative rotary members according to claim 1, wherein the lubricant storing portion is formed by a plurality of grooves radially disposed on the one of the first and second sliding surfaces.

3. The relaying apparatus between relative rotary members according to claim 2, wherein the first sliding surface extends radially from the outer wall surface of the first rotary body, the second sliding surface extends radially from the inner wall surface of the second rotary body, and the lubricant storing portions are disposed radially on the inner wall surface.

4. The relaying apparatus between relative rotary members according to claim 3, wherein the lubricant storing portion has a wall surface, the wall surface of the lubricant storing portion being slanted in a direction to be closer to the inner wall surface at a deeper side.

5. The relaying apparatus between relative rotary members according to claim 1, further comprising:

a cover member engaging the second rotary body, the cover member having a fourth sliding surface for sliding against the third sliding surface for the first rotary body, wherein at least one of the third and the fourth sliding surfaces has a lubricant storing portion having a groove formed for storing lubricant therein.

* * * * *